(12) United States Patent
Blackmore et al.

(10) Patent No.: US 10,530,000 B2
(45) Date of Patent: Jan. 7, 2020

(54) EXHAUST ASSEMBLY

(71) Applicant: Intelligent Energy Limited, Loughborough (GB)

(72) Inventors: Karl Blackmore, Loughborough (GB); Gareth Coates, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 226 days.

(21) Appl. No.: 15/532,776

(22) PCT Filed: Dec. 2, 2015

(86) PCT No.: PCT/GB2015/053684
§ 371 (c)(1),
(2) Date: Jun. 2, 2017

(87) PCT Pub. No.: WO2016/087852
PCT Pub. Date: Jun. 9, 2016

(65) Prior Publication Data
US 2017/0358811 A1  Dec. 14, 2017

(30) Foreign Application Priority Data
Dec. 3, 2014 (GB) .................................. 1421452.2

(51) Int. Cl.
*H01M 8/0662* (2016.01)
*H01M 8/04* (2016.01)
*H01M 8/1018* (2016.01)

(52) U.S. Cl.
CPC ........... *H01M 8/0662* (2013.01); *H01M 8/04* (2013.01); *H01M 2008/1095* (2013.01)

(58) Field of Classification Search
CPC ....................................................... F24F 13/08
See application file for complete search history.

(56) References Cited

U.S. PATENT DOCUMENTS

| 4,336,863 A | 6/1982 | Satomi | |
| 7,560,186 B2 * | 7/2009 | Fukuma | H01M 8/0662 |
| | | | 429/444 |

(Continued)

FOREIGN PATENT DOCUMENTS

| CN | 101694946 A | 4/2010 |
| CN | 102763256 A | 10/2012 |

(Continued)

OTHER PUBLICATIONS

International Patent Application No. PCT/GB2015/053684; Int'l Preliminary Report on Patentability; dated Jun. 6, 2017; 7 pages.

*Primary Examiner* — Maria Laios
(74) *Attorney, Agent, or Firm* — BakerHostetler

(57) ABSTRACT

An exhaust assembly for a fuel cell system, comprising a plenum having an inlet configured to receive a gas flow from the fuel cell system and an outlet configured to vent said gas flow to atmosphere, the plenum including a louvre assembly for controlling the flow through the plenum between the inlet and outlet, wherein the plenum includes a purge gas inlet downstream of the louvre assembly configured to introduce a purge gas of the fuel cell system into the gas flow for dilution thereof, the louvre assembly configured to induce, in use, a lower pressure region proximal the purge gas inlet relative to a region distal the purge gas inlet within the plenum.

20 Claims, 3 Drawing Sheets

(56) References Cited

U.S. PATENT DOCUMENTS

| | | | |
|---|---|---|---|
| 2004/0072052 A1* | 4/2004 | Yamamoto | H01M 8/04223 |
| | | | 429/415 |
| 2004/0170878 A1* | 9/2004 | Goebel | H01M 8/0228 |
| | | | 429/414 |
| 2009/0045006 A1 | 2/2009 | Kondo et al. | |

FOREIGN PATENT DOCUMENTS

| | | |
|---|---|---|
| CN | 103515670 A | 1/2014 |
| CN | 103894019 A | 7/2014 |
| WO | WO 2014/174299 A1 | 10/2014 |
| WO | WO-2014174299 A1 * | 10/2014 ........ H01M 8/04164 |

* cited by examiner

EXHAUST ASSEMBLY

CROSS-REFERENCE TO RELATED APPLICATIONS

This patent application is a National Stage Application of international patent application PCT/GB2015/053684 filed Dec. 2, 2015, which claims priority to Great Britain patent application 1421452.2 filed Dec. 3, 2014, the disclosures of which are incorporated by reference in their entirety.

This invention relates to an exhaust assembly. In particular, it relates to a plenum of an exhaust assembly for diluting purge gas prior to release to atmosphere. The invention also relates to a fuel cell system.

Conventional electrochemical fuel cells convert fuel and oxidant into electrical energy and a reaction product. A common type of electrochemical fuel cell comprises a membrane electrode assembly (MEA), which includes a polymeric ion (proton) transfer membrane between an anode flow path or gas diffusion structure and a cathode flow path or gas diffusion structure. The fuel, such as hydrogen, and the oxidant, such as oxygen from air, are passed over respective sides of the MEA to generate electrical energy and water as the reaction product. A stack may be formed comprising a number of such fuel cells arranged with separate anode and cathode fluid flow paths. Such a stack is typically in the form of a block comprising numerous individual fuel cell plates held together by end plates at either end of the stack. It is important that the polymeric ion transfer membrane remains hydrated for efficient operation. It is also important that the temperature of the stack is controlled. Thus, coolant may be supplied to the stack for cooling and/or hydration. It may be necessary at particular times or periodically to purge the flow paths or gas diffusion structures of the fuel cell of coolant, contaminants, or reaction by-products using a purge gas. The purge gas, which may comprise the fuel (hydrogen for example), may be flowed through the anode flow path to purge the fuel cell.

According to a first aspect of the invention we provide an exhaust assembly for a fuel cell assembly, comprising a plenum having an inlet configured to receive a gas flow from the fuel cell assembly and an outlet configured to vent said gas flow to atmosphere, the plenum including a louvre assembly for controlling the flow through the plenum between the inlet and outlet, wherein the plenum includes a purge gas inlet downstream of the louvre assembly configured to introduce a purge gas of the fuel cell assembly into the gas flow for dilution thereof, the louvre assembly configured to induce, in use, a lower pressure region proximal the purge gas inlet relative to a region distal the purge gas inlet within the plenum.

This is advantageous as the louvre assembly provides an advantageous structure for modifying the gas flow over the purge gas inlet. This may advantageously promote flow through the purge gas inlet into the plenum by virtue of the lower pressure region created in the plenum by the louvre assembly. The louvre assembly therefore conveniently performs two functions of controlling the gas flow between the inlet and outlet and promoting the flow from the purge gas inlet. This may obviate the need for other structures or fans.

The louvre assembly may be configured to actively control gas flow when the fuel cell assembly is in use.

Optionally, the louvre assembly comprises a plurality of louvers. The louvres may be arranged in an array side by side. Optionally, at least one or more of the louvres are each rotatable for controlling the gas flow.

Optionally, the plenum forms a channel between the inlet and the outlet and the plurality of louvres are arranged in a plane substantially perpendicular to the channel.

Optionally, the louvre assembly is moveable between a closed position in which the louvre assembly substantially blocks the plenum and an open position configured to permit the gas flow through the louvre assembly.

Optionally, a subset of the plurality of louvres are shaped differently to create said lower pressure region. Modification to the shape of a subset of louvres provides a convenient way of creating the lower pressure region.

Optionally, the subset comprises louvres of the plurality of louvres that are closest to the purge gas inlet.

Optionally, the subset of louvres are configured to present a larger cross-sectional area to the gas flow than the louvres not forming part of the subset. The larger area provide more of an obstruction to gas flow, thereby (within limits) increasing its velocity over the louvre which may lead to the lower pressure region.

Optionally, the louvre(s) of the subset comprises a wider leading and/or trailing edge. Optionally, the louvre(s) of the subset are thicker perpendicular to chord line. It will be appreciated that the shape of the louvres of the subset may be relative to one or more of the louvres not part of the subset or relative to an average of the louvres not part of the subset.

Optionally, the louvre assembly includes a fixed louvre and at least one movable louvre for controlling the gas flow, the fixed louvre located closest to the purge gas inlet. Again, the moveable louvres may be configured to actively control the gas flow.

Optionally, one of the at least one movable louvres is moveable between a closed position in which it contacts the fixed louvre and an open position in which it is spaced from the fixed louvre.

Optionally, the fixed louvre includes a leading edge with respect to the gas flow substantially adjacent a side wall through which the purge gas inlet enters the plenum. Optionally, the fixed louvre includes a leading edge with respect to the gas flow that extends from a side wall through which the purge gas inlet enters the plenum.

Optionally, the fixed louvre includes a trailing edge with respect to the gas flow substantially above and spaced from where the purge gas inlet enters the plenum. Optionally, the fixed louvre includes a trailing edge with respect to the gas flow substantially downstream and spaced from where the purge gas inlet enters the plenum.

Optionally, the fixed louvre includes a slot or a plurality of slots therethrough.

Optionally, the or each slot is angled to direct gas flow from the inlet towards a side wall through which the purge gas inlet enters the plenum.

Optionally, upstream of the louvre assembly, the plenum includes a diversion aperture configured to receive the gas flow from the inlet at least when the louvre assembly adopts a configuration in which it substantially blocks the plenum.

Optionally, the plenum includes a fan assembly between the inlet and the louvre assembly, the fan assembly configured to draw the gas flow through the plenum.

Optionally, the purge gas inlet is located in a side wall of the plenum.

Optionally, the purge gas inlet includes a hood configured to extend into the plenum from the side wall from which the purge gas inlet enters the plenum and includes an open aperture that substantially faces a downstream direction with respect to said gas flow through the plenum.

Optionally, the hood comprises a deflection surface opposite the open aperture for directing the air flow, when in use, around the hood.

According to a further aspect of the invention we provide a fuel cell system comprising a fuel cell assembly and the exhaust assembly of the first aspect, the fuel cell assembly including an anode flow path and cathode flow path either side of an active area, an exhaust of the anode flow path connected to the purge gas inlet of the exhaust system.

Optionally, an exhaust port of the cathode flow path is connected to the inlet of the exhaust assembly. Thus, the gas flow through the plenum comprises the cathode exhaust.

There now follows, by way of example only, a detailed description of embodiments of the invention with reference to the following figures, in which.

Figure 1:
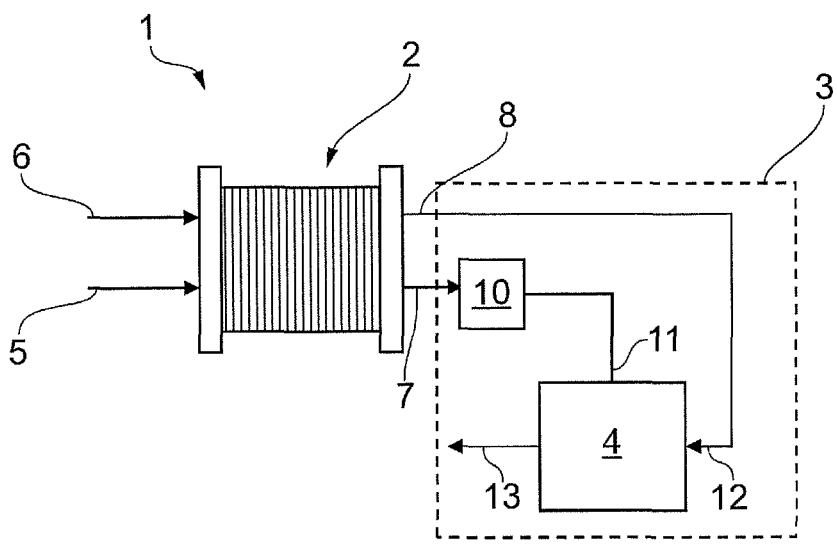
FIG. 1 shows a schematic view of an example fuel cell system.

FIG. 1 shows a fuel cell system 1 comprising a fuel cell assembly 2 and an exhaust assembly 3 for venting the exhaust flow from the fuel cell assembly 2 to atmosphere. The exhaust assembly 3 includes a plenum 4 configured to receive fluids leaving an anode flow path through the fuel cell assembly 2 and a cathode flow path though the fuel cell assembly 2. During a purge operation, a gas, such as a fuel (e.g. hydrogen), is flowed through the anode flow path to purge the anode flow path of coolant, hydration fluid, contaminants and/or reaction by-products. The plenum 4 is configured to receive the exhausting purge gas and dilute it prior to its release to atmosphere.

The fuel cell assembly 2 in this example comprises a fuel cell stack including a plurality of proton exchange membrane fuel cells stacked together. The fuel cell assembly 2 is configured to receive a flow of fuel, such as hydrogen, through an anode inlet 5 and a flow of oxidant, such as air, through a cathode inlet 6. An anode exhaust 7 is provided to allow for through flow of any unused fuel and any purge gas. A cathode exhaust 8 is provided to allow for through flow of the oxidant.

A purge control valve 10 is connected to the anode exhaust 7 and controls the passage of purge gas to the plenum 4. In other embodiments, no purge control valve is provided between the anode exhaust 7 and the plenum 4. The plenum 4 includes a purge gas inlet 11 for receiving the purge gas from the anode exhaust 7. The cathode exhaust outlet 8 from the fuel cell assembly 2 also connects to the plenum 4. Accordingly, the plenum 4 includes an inlet 12 for receiving the cathode exhaust flow from the cathode exhaust 8. The exhaust assembly 3 includes, downstream of the inlet 12 and purge gas inlet 11, an outlet 13 from the plenum 4 to atmosphere. Although in this embodiment the plenum 4 is configured to dilute the purge gas with the cathode exhaust gas, in other embodiments a different gas flow, such as of atmospheric air, may be received at inlet 12.

Figure 2:
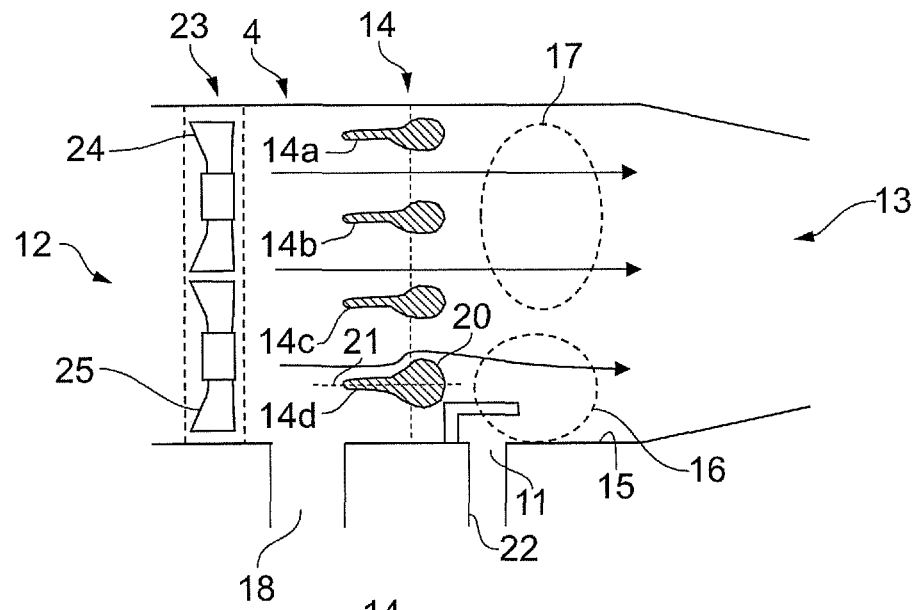
FIG. 2 shows a schematic cross sectional view of an example exhaust assembly for a fuel cell system having louvres in an open position.

With reference to FIG. 2, the plenum 4 includes a louvre assembly 14 for controlling the flow through the plenum 4 between the inlet 12 and outlet 13. The plenum 4 comprises an elongate housing comprising an open end forming the inlet 12, an opposed, open end forming the outlet 13 and one or more side walls therebetween (depending on the cross-sectional profile). The plenum 4 may be of substantially square or rectangular cross-section. The purge gas inlet 11 is located downstream of the louvre assembly 14 and is configured to introduce the purge gas from the fuel cell assembly 2 into the gas flow between the inlet 12 and outlet 13 for dilution. The purge gas inlet 11 enters the plenum 4 through a side wall 15 adjacent to part of the louvre assembly 14, where the louvre assembly 14 extends over the whole cross section area of the housing. The louvre assembly, and in particular the part of it adjacent the purge gas inlet 11, is configured to induce, in use, a lower pressure region 16 proximal the purge gas inlet 11 relative to a region 17 above and distal the purge gas inlet 11 within the plenum 4. Thus, in general, the plenum, in use, may have a positive pressure due to the gas flow between the inlet and outlet but the louvre assembly is configured to create a lower pressure region (such as lower than atmospheric pressure) adjacent the opening of the purge gas inlet into the plenum.

Figure 3:
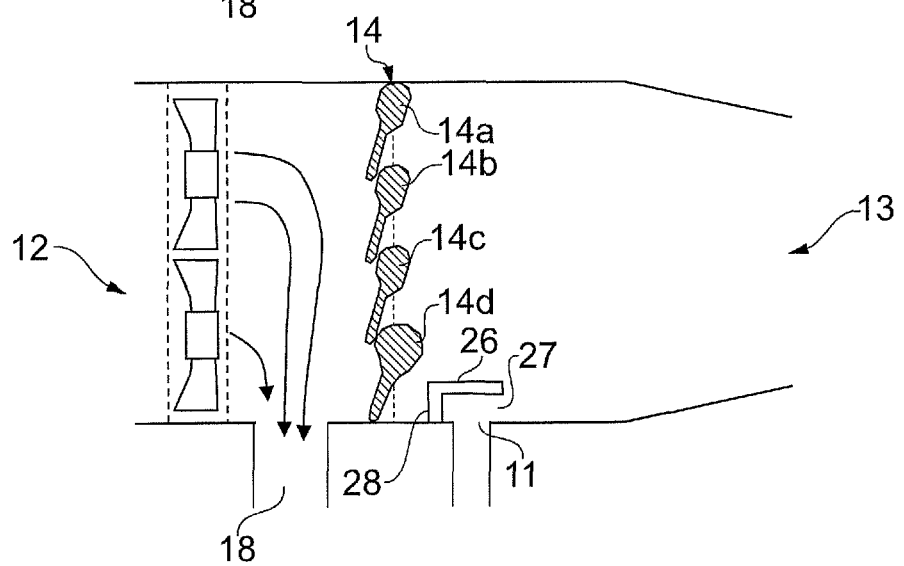
FIG. 3 shows a schematic cross sectional view of the exhaust assembly of FIG. 2 with the louvres in a closed position.

The louvre assembly 14 comprises a plurality of louvres 14a-d arranged in an array. FIG. 2 shows four louvres in the array which extends substantially perpendicular to the flow through the plenum 4 from the inlet 12 to the outlet 13. Each of the louvres extends across the full width of the plenum. The louvres 14a-d are each rotatable for controlling the gas flow from the inlet 12 to the outlet 13. The louvres are each rotatable about their axis, which extends into and out of the page in the view shown in FIG. 2. Each louvre 14a-d of the louvre assembly 14 is rotatable between a closed position (FIG. 3) in which the louvre assembly substantially blocks gas flow through the plenum 4 and an open position (FIG. 2) configured to permit the gas flow through the louvre assembly 14. Thus, in the closed position, as shown in FIG. 3, each of the louvres 14a-d has rotated such that the louvres 14a-d contact one another and the louvres 14a and 14d at the ends of the louvre assembly 14 contact the side walls of the plenum 4. In this position the louvres 14a-d form a blockage in the plenum 4. In this example, when the louvres 14a-d are in the closed position, gas flow received via the inlet 12 is diverted into a diversion aperture 18 for re-use in the fuel cell assembly, for example. The position, such as rotational position, of the louvres 14a-d may be actively controlled during operation. Further, the louvres 14a-d may be connected together such that they rotate in unison.

In the example of FIG. 2, the lower pressure region 16 is induced by the shape of a subset of the plurality of louvres. The fourth louvre 14d of the louvre assembly 14 is shaped differently to the other louvres 14a-c to create said lower pressure region 16. Thus, in this example, only the louvre 14d nearest the purge gas inlet 11 forms part of the subset, although in other examples, more than one louvre may form part of the subset. In particular, the subset may comprises the louvre(s) of the louvre assembly 14 that are closest to the purge gas inlet 11.

The fourth louvre 14d has a different shape to the other louvres 14a-c. In particular, the fourth louvre has a larger head portion or thickness to present a larger cross-sectional area to the gas flow. The louvre 14d of the subset may have a thicker leading edge and/or a thicker trailing edge compared to the other louvres. Further, the louvre 14d of the subset may be thicker perpendicular to a chord line 21 of the louvre.

The shape and/or thickness of the louvre 14d causes it to act as an aerofoil and creates the lower pressure region 16. This is advantageous as the lower pressure region 16 acts to draw fluid out of a conduit 22 that conveys the purge gas from the valve 10 (and also the anode exhaust 7) to the inlet 11. The conduit 22 may be at atmospheric pressure at least in between purge operations. Thus, the lower pressure region 16 may be at a lower pressure than atmospheric pressure.

Upstream of the louvre assembly 14 and the recirculation aperture 18, the plenum includes a fan assembly 23. The fan assembly 23 is configured to move the gas flow from the inlet 12 through the plenum 4 to the outlet 13. The fan assembly comprises two fans 24, 25, which may be selectively actuated and/or their fan speed controlled, together or individually. The fan assembly 23 may be controlled based on the performance of or to control the fuel cell assembly 2.

The purge gas inlet 11 includes a hood 26 configured to extend into the interior volume of the plenum 14 from the side wall 15. The hood 26 is shaped to divert the flow through the inlet 11 and into the plenum 14 in a downstream direction with respect to the gas flow between the inlet 12 and outlet 13. Accordingly, the hood 26 includes an open aperture 27 that substantially faces a downstream direction. The hood 26 itself, by virtue of it extending into the gas flow between the inlet 12 and outlet 13 and deflecting it around the hood 26 by a deflection surface 28, creates a low pressure region around the aperture 27. However, in combination with the subset of the louvres 14d the hood 26 and louvre assembly 14 provides for an effective and space efficient means for voiding the conduit 22 of purge gas. The hood 26 may be narrower in width compared to the louvres 14a-d, which extend across the whole width of the plenum 4.

In use, the plenum 4 typically adopts the configuration shown in FIG. 2, in which the louvre assembly 14 is in an open position and the fan assembly 23 is driving the cathode exhaust flow through the plenum 4 to atmosphere.

During a purge operation, which may occur on start-up or shut-down or periodically or on instruction, hydrogen fuel is flowed through the anode flow path via anode inlet 5 and anode exhaust 7 at (possibly) an elevated pressure to normal hydrogen flow pressure. This purges the fuel cell assembly 2 but results in a relatively high concentration of hydrogen in the exhaust assembly 3 that needs dilution before release to atmosphere.

If present, the valve 10 may actuate on initiation of a purge operation to release the purge gas into the plenum 4 through the inlet 11. The hydrogen pressure present during a purge operation may be sufficient in itself to drive the hydrogen into the plenum 4 for dilution with the cathode exhaust flow. On termination of the purge operation, the pressure in conduit 22 falls, which may cause hydrogen gas to remain in the exhaust system in relatively high concentrations. However, the lower pressure region 16 created by the louvre assembly 14 in the plenum 4 acts to draw the hydrogen out of conduit 22 and into the plenum 4. The lower pressure region 16 may also assist in the dilution of hydrogen during a purge operation. The louvre assembly being configured to produce a localised lower pressure region, located at the purge gas inlet, within the larger volume of the plenum is advantageous.

Figure 4:
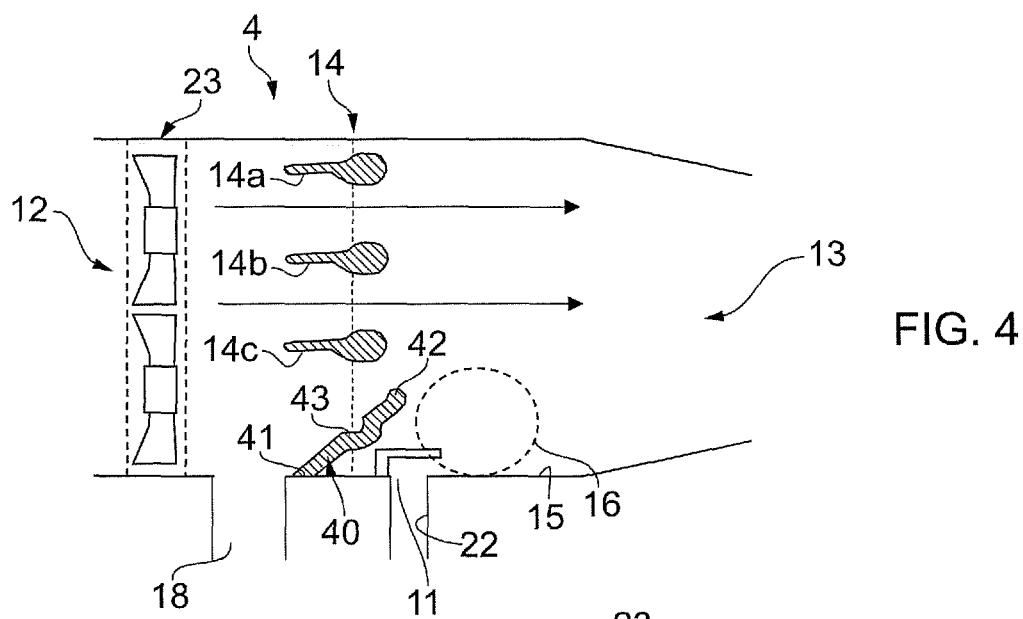
FIG. 4 shows a schematic cross sectional view of a further example exhaust assembly for a fuel cell system having a fixed louvre.

FIG. 4 shows a further example plenum 4 and the same reference numerals have been used for equivalent parts. The plenum 4 of FIG. 4 includes a different louvre assembly 14. In particular, the louvre assembly includes a plurality of movable louvres (three) 14a-c and a fixed louvre 40. The fixed louvre 40 is located closest to the purge gas inlet 11. The fixed louvre can be considered to replace the louvre 14d closest to the purge gas inlet 11 of the example in FIG. 2. Thus, the moveable louvres 14a-c are configured to actively control the cathode exhaust flow through the plenum 4. In the closed position in which the plenum 4 is blocked by the louvre assembly 14 forming a barrier, the louvre 14c closest to the fixed louvre 40 is configured to contact the fixed louvre 40 to form said barrier. In the open position, the louvre 14c is spaced from the fixed louvre 40.

The fixed louvre 40 is configured to create the lower pressure region 16 localised on the purge gas inlet 11. The fixed louvre 40 extends from the side wall 15 through which the purge gas inlet 11 extends and into the interior volume of the plenum 4. The fixed louvre 40 is inclined at an angle of approximately 20-70° or 20-60° or 20-50° to the side wall 15. The fixed louvre extends across the width of the plenum 4. Thus, the fixed louvre 40 has a leading edge 41 with respect to the gas flow from the inlet 12 to the outlet 13 extending from the side wall 15. In other examples, the leading edge 41 is substantially adjacent the side wall 15. A trailing edge 42 of the fixed louvre 40 is arranged substantially above (perpendicular to the side wall 15 and into the interior volume of the plenum) and spaced from the purge gas inlet 11. In other examples, the trailing edge 42 is located substantially downstream of and spaced from the purge gas inlet 11 such that the purge gas inlet extends from a longitudinal position with respect to the plenum 4 between the leading 41 and trailing edges 42 of the fixed louvre 40 (or movable louvre in further examples).

The fixed louvre 40 includes an indentation 43 across its width. The indentation is configured to receive an edge of the louvre 14c closest thereto when the louvre assembly 14 adopts the closed position.

The fixed louvre 40 causes a localised increase in flow rate over the purge gas inlet 11 and associated pressure drop leading to the lower pressure region 16. The gas flow in the cavity between the side wall 15 and the fixed louvre 40 may become turbulent, which may assist in mixing the hydrogen from the purge gas inlet 11 with the cathode exhaust flow.

Figure 5:
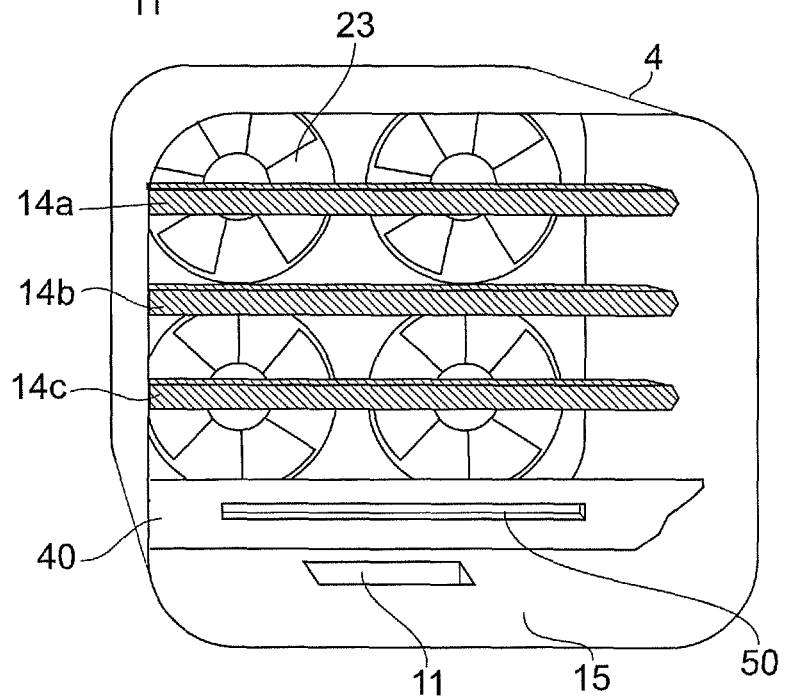
FIG. 5 shows a schematic perspective view of the example exhaust assembly of FIG. 4.

FIG. 5 shows a further example, similar to that shown in FIG. 4, and the same reference numerals have been used for equivalent parts. In this example, the fan assembly 23 includes four fans. Further, the fixed louvre 40 includes a slot 50 extending through the fixed louvre 40 from a side directed towards the inlet 12 to a side directed towards the outlet 13. The slot 50 may extend across the whole width of the louvre, a majority or a minority of the width of the fixed louvre 40. The slot 50 may be positioned along the width of the fixed louvre 40 in alignment with the purge gas inlet 11.

The slot 50 is advantageous as it provide for a flow of gas between the inlet 12 and the outlet 13 even when the louvre assembly 14 is in the closed position. Thus, the lower pressure region 16 can be created by the flow through the slot 50. It will be appreciated that when the louvre assembly 14 is in a closed position the flow through the slot 50 may be sufficient as the remainder of the plenum downstream of the louvre assembly 14 will be at substantially atmospheric pressure. However, when the louvre assembly 14 is in an open position, the flow over the fixed louvre 40 may be required to generate a flow rate sufficient to create the lower pressure region 16 given the overall flow through the plenum 4.

In another example, a plurality of slots 50 are provided in the fixed louvre 40. In another embodiment, not shown, a slot 50 or plurality of slots is provided in the moveable louvre 14d, closest to the purge gas inlet 11 or in the louvre that has the most significant impact on the gas flow over the purge gas inlet 11.

Figure 6:
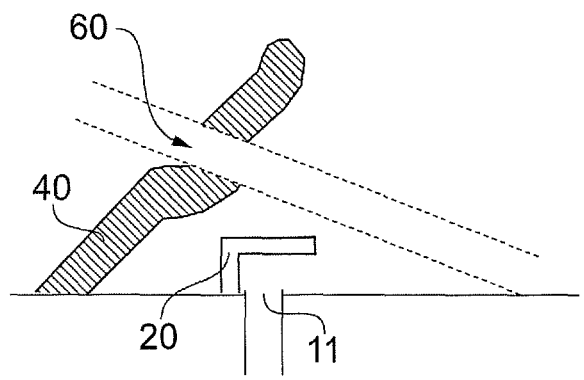
FIG. 6 shows a schematic cross sectional view through a fixed louvre.

FIG. 6 shows a further example in which the angle of a slot 60 (similar to slot 50 of FIG. 5) through the fixed louvre 40 is directed towards the side wall 15. Thus, the slot 60 is angled to direct gas flow from the inlet towards the side wall 15 through which the purge gas inlet 11 enters the plenum 4. FIG. 6 shows the slot 60 angled such that it points towards the side wall 15 downstream of the purge gas inlet 11. Having a slot 60 that is inclined to the average flow direction through the plenum 4 advantageously creates a lower pressure region 16 around the purge gas inlet 11.

Figure 7:
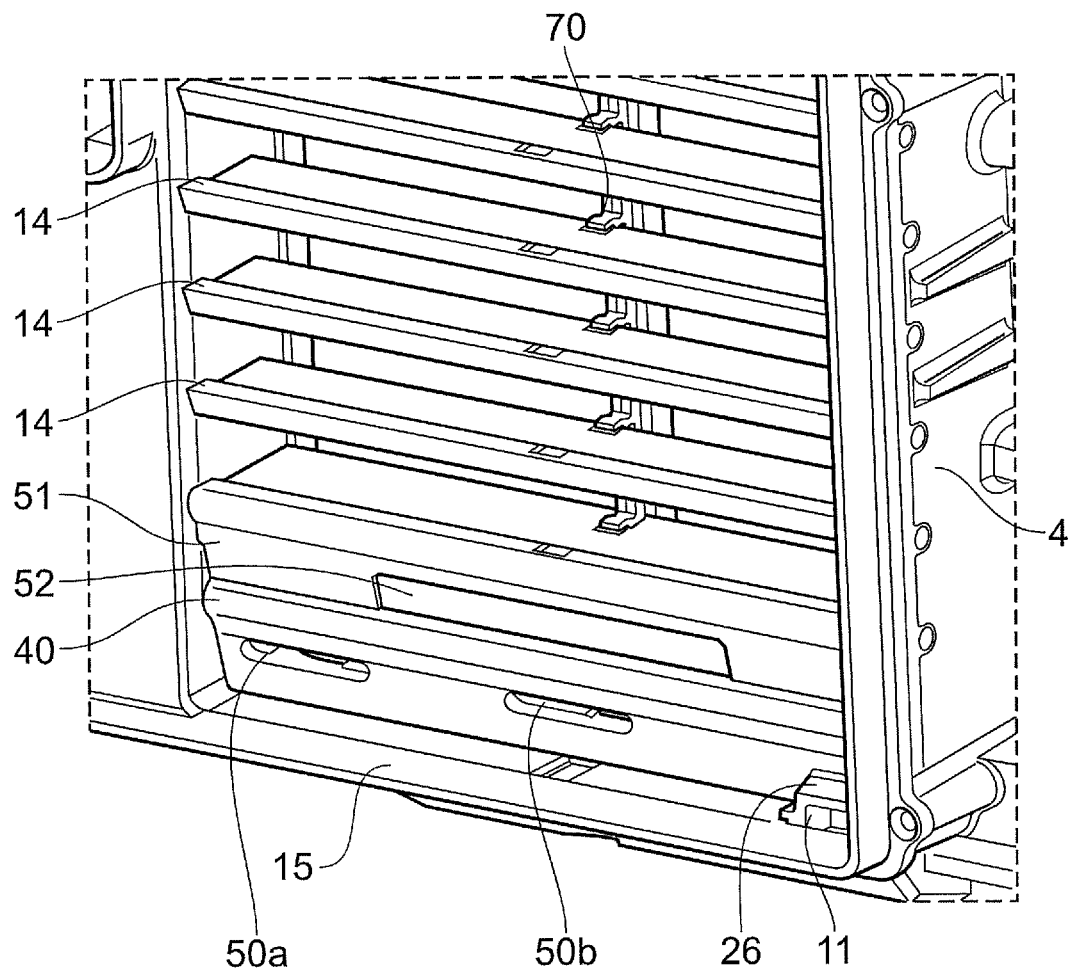
FIG. 7 shows a schematic perspective view of a further example exhaust assembly for a fuel cell system.

FIG. 7 shows a further example, in which the purge gas inlet 11 is located at one side of the plenum 4 rather than in the centre of the side wall 15. A fixed louvre 40 is shown having a plurality of slots 50a, 50b therein. The slots 50a and 50b are configured to pass a flow to the side of the purge gas inlet 11 rather than above it. FIG. 7 also shows a louvre connector bar 70 which connects to each of the movable louvres 14 to change their position together as a set.

The hood 26, in this example, is integral with the fixed louvre 40 and thus the fixed louvre includes a projection that extends downstream and over the opening of the inlet 11 into the plenum such that the purge gas enters into the interior space of the plenum in a downstream direction (relative to the inlet 12 to outlet 13 flow).

Further, in this example, the second closest louvre 14c to the purge gas inlet 11 is different to the louvres further from the inlet 11. Thus, both the closest and second closest louvres to the purge gas inlet 11 are configured to modify the air flow in the region of the purge gas inlet 11. In particular, the louvre 14c includes a trailing edge flap 51 configured to extend between the louvre 14c and the fixed louvre 40 when the louvres are in the open position. The flap 51 includes a slot 52 extending only partly across the width of the flap. The flap 51 extends across the width of the plenum 4. The slot 52 is located centrally in said flap 51, although it may be located in other positions. It has been found that the modification of the air flow (by the louvres) to create a low pressure and possibly turbulent air flow in half of the plenum closest to the purge gas inlet is advantageous. In other embodiments it may be preferable to provide louvres that provides substantially laminar flow further from the purge gas inlet 11 and faster and/or more turbulent flow closer to the purge gas inlet 11.

The slot 50 and or angled slot 60 may be provided in any of the examples described above. The examples discussed above in relation to FIGS. 2-4 and 7 show a hood 26, which may or may not be present. The fixed louvre 40 may be formed by a localised projection of the side wall 15 into the interior volume of the plenum 4. At least one of the other louvres of the louvre assembly 14 may be configured to contact the localised projection.

The invention claimed is:

1. An exhaust assembly for a fuel cell assembly, comprising a plenum having an inlet configured to receive a gas flow from the fuel cell assembly and an outlet configured to vent said gas flow to atmosphere;
   the plenum including a louvre assembly having a plurality of louvre for controlling the flow through the plenum between the inlet and outlet;
   wherein the plenum includes a purge gas inlet downstream of the louvre assembly configured to introduce a purge gas of the fuel cell assembly into the gas flow for dilution thereof; and,
   wherein the louvre assembly configured to induce, in use, a lower pressure region proximal the purge gas inlet relative to a region distal the purge gas inlet within the plenum;
   wherein at least one of the louvres is rotatable; and,
   wherein said rotation controls the gas flow.

2. An exhaust assembly according to claim 1, in which the plenum forms a channel between the inlet and the outlet and the plurality of louvres are arranged in a plane substantially perpendicular to the channel.

3. An exhaust assembly according claim 1, in which louvre assembly is moveable between a closed position in which the louvre assembly blocks gas flow through the plenum and an open position configured to permit the gas flow through the louvre assembly.

4. An exhaust assembly according to claim 1, in which a subset of the plurality of louvres are shaped differently to create said lower pressure region.

5. An exhaust assembly according to claim 4, in which the subset comprises louvres of the plurality of louvres that are closest to the purge gas inlet.

6. An exhaust assembly according to claim 4, in which the subset of louvres are configured to present a larger cross-sectional area to the gas flow than the louvres not forming part of the subset.

7. An exhaust assembly according to claim 1, in which the purge gas inlet is located in a side wall of the plenum.

8. An exhaust assembly according to claim 7, in which the purge gas inlet includes a hood configured to extend into the plenum from the side wall from which the purge gas inlet enters the plenum and includes an open aperture that faces a downstream direction with respect to said gas flow through the plenum.

9. An exhaust assembly for a fuel cell assembly, comprising: a plenum having an inlet configured to receive a gas flow from the fuel cell assembly and an outlet configured to vent said gas flow to atmosphere the plenum including a louvre assembly for controlling the flow through the plenum between the inlet and outlet wherein the plenum includes a purge gas inlet downstream of the louvre assembly configured to introduce a purge gas of the fuel cell assembly into the gas flow for dilution thereof, and, wherein the louvre assembly configured to induce, in use, a lower pressure region proximal the purge gas inlet relative to a region distal the purge gas inlet within the plenum; the louvre assembly includes a fixed louvre and at least one movable louvre, said fixed louvre located closest to the purge gas inlet; and,
   wherein the fixed and movable louvre cooperate to control gas flow.

10. An exhaust assembly according to claim 9, in which one of the at least one movable louvres is moveable between a closed position in which it contacts the fixed louvre and an open position in which it is spaced from the fixed louvre.

11. An exhaust assembly according to claim 9, in which the fixed louvre includes a leading edge with respect to the gas flow adjacent a side wall through which the purge gas inlet enters the plenum.

12. An exhaust assembly according to claim 9, in which the fixed louvre includes a leading edge with respect to the gas flow that extends from a side wall through which the purge gas inlet enters the plenum.

13. An exhaust assembly according to claim 9, in which the fixed louvre includes a trailing edge with respect to the gas flow above and spaced from where the purge gas inlet enters the plenum.

14. An exhaust assembly according to claim 9, in which the fixed louvre includes a trailing edge with respect to the gas flow downstream of and spaced from where the purge gas inlet enters the plenum.

15. An exhaust assembly according to claim 9, in which the fixed louvre includes a slot therethrough.

16. An exhaust assembly according to claim 15, in which the slot is angled to direct gas flow from the inlet towards a side wall through which the purge gas inlet enters the plenum.

17. An exhaust assembly according to claim 9, in which upstream of the louvre assembly, the plenum includes a diversion aperture configured to receive the gas flow from the inlet at least when the louvre assembly adopts a configuration in which it substantially blocks the plenum.

18. An exhaust assembly according to claim 9, in which the plenum includes a fan assembly between the inlet and the louvre assembly, the fan assembly configured to draw the gas flow through the plenum.

19. An exhaust assembly according to claim 8, in which the hood comprises a deflection surface opposite the open aperture for directing the airflow, when in use, around the hood.

20. An exhaust assembly according to claim 9; wherein the at least one movable louvre is movable between a closed position in which the louvre assembly blocks gas flow through the plenum and an open position configured to permit the gas flow through the louvre assembly; and, the at least one movable louvre includes a trailing edge flap configured to contact the fixed louvre when the louvres are in a closed position.

* * * * *